(12) United States Patent
Esteghlal et al.

(10) Patent No.: US 9,038,438 B2
(45) Date of Patent: May 26, 2015

(54) METHOD AND DEVICE FOR DETECTING THE INDEPENDENT RUNNING OF AN INTERNAL COMBUSTION ENGINE

(75) Inventors: Gholamabas Esteghlal, Stuttgart-Weilimdorf (DE); Rolf Stracke, Neuenbuerg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 243 days.

(21) Appl. No.: 13/213,528

(22) Filed: Aug. 19, 2011

(65) Prior Publication Data

US 2012/0047997 A1     Mar. 1, 2012

(30) Foreign Application Priority Data

Aug. 26, 2010   (DE) .......................... 10 2010 039 800

(51) Int. Cl.
| | |
|---|---|
| *G01M 15/08* | (2006.01) |
| *F02D 35/02* | (2006.01) |
| *F02D 41/22* | (2006.01) |
| *F02N 11/10* | (2006.01) |
| *B60W 20/00* | (2006.01) |
| *F02D 41/04* | (2006.01) |
| *F02D 41/06* | (2006.01) |

(52) U.S. Cl.
CPC ............ *F02D 35/023* (2013.01); *F02D 35/027* (2013.01); *F02D 41/221* (2013.01); *F02N 11/10* (2013.01); *B60W 20/00* (2013.01); *B60W 2510/06* (2013.01); *F02D 41/042* (2013.01); *F02D 41/062* (2013.01); *Y02T 10/40* (2013.01)

(58) Field of Classification Search
USPC ......... 73/35.01, 35.03, 35.06, 114.02, 114.07
See application file for complete search history.

(56) References Cited

U.S. PATENT DOCUMENTS

| | | | | |
|---|---|---|---|---|
| 4,312,215 | A  * | 1/1982  | Dobler et al. ............... | 73/114.06 |
| 5,979,406 | A  * | 11/1999 | Aoki et al. ................. | 123/406.37 |
| 6,457,351 | B1 * | 10/2002 | Yamamoto .................. | 73/116.05 |
| 2002/0068999 | A1 * | 6/2002 | Kotre et al. ..................... | 701/22 |
| 2004/0089056 | A1 * | 5/2004 | Tanaya .......................... | 73/35.08 |
| 2007/0284161 | A1 * | 12/2007 | Ohno ............................ | 180/65.2 |
| 2008/0097661 | A1 * | 4/2008 | Moran .............................. | 701/22 |
| 2010/0203995 | A1 * | 8/2010 | Zhang et al. ...................... | 475/5 |
| 2011/0208401 | A1 * | 8/2011 | Pantring et al. ................ | 701/101 |
| 2012/0010802 | A1 * | 1/2012 | Ma et al. ........................ | 701/113 |
| 2012/0116629 | A1 * | 5/2012 | Kamoshida ..................... | 701/22 |
| 2013/0041535 | A1 * | 2/2013 | Choi et al. ...................... | 701/22 |

* cited by examiner

*Primary Examiner* — Eric S McCall
(74) *Attorney, Agent, or Firm* — Kenyon & Kenyon LLP

(57) ABSTRACT

A method is described for detecting the independent running and/or the start/stop of an internal combustion engine, in which parameters of the internal combustion engine characterizing the combustion process, especially pressure changes or vibrations, are evaluated for this detection.

15 Claims, 2 Drawing Sheets

METHOD AND DEVICE FOR DETECTING THE INDEPENDENT RUNNING OF AN INTERNAL COMBUSTION ENGINE

RELATED APPLICATION INFORMATION

The present application claims priority to and the benefit of German patent application no. 10 2010 039 800.4, which was filed in Germany on Aug. 26, 2010, the disclosure of which is incorporated herein by reference.

FIELD OF THE INVENTION

The present invention relates to a method for detecting the independent running of an internal combustion engine which is tow-started from its position of rest by a start-assist apparatus, as well as a device for implementing the method.

BACKGROUND INFORMATION

Internal combustion engines of a motor vehicle are not able to initiate their active operation independently. For this reason, in conventional vehicles, the internal combustion engines are set in motion by an electrically operated starter. The necessary processes of mixture formation, combustion, engine-speed sensing and charge sensing of the internal combustion engine are started simultaneously with the operation of the starter. The independent running of the internal combustion engine is recognized when the speed of the internal combustion engine is above the speed of the starter or when the speed of the internal combustion engine exceeds a defined threshold. When the internal combustion engine has started to move independently, the starter is decoupled again from the internal combustion engine.

In hybrid systems which have two power plants in the form of the internal combustion engine and an electric motor, the internal combustion engine may be started by the electric motor or by the starter. With such a hybrid drive, it is possible to start the internal combustion engine from the motor-vehicle standstill. However, it is also possible to start the internal combustion engine during operation solely on electrical power with the electric motor as drive. The transition from electrical operation to hybrid operation, in which the electric motor or the starter starts the internal combustion engine and the vehicle is then powered by the electric motor and the internal combustion engine, may be initiated in the following manner. An interrupting clutch, situated between the internal combustion engine and the electric motor, is closed, and the electric motor tow-starts the internal combustion engine until the internal combustion engine is running on its own.

A further possibility is that the interrupting clutch between the internal combustion engine and the electric motor is initially open. While the vehicle is in operation, the interrupting clutch is then closed in a dragging fashion in the form of a proportional clutch or abruptly with the aid of an impulse clutch or a proportional clutch. In the cases described, it is not possible to say whether the internal combustion engine is running independently based on the analysis of the speed of the internal combustion engine, since the internal combustion engine may be pulled along by the electric motor.

SUMMARY OF THE INVENTION

Therefore, an object of the exemplary embodiments and/or exemplary methods of the present invention is to reliably detect an independent running of the internal combustion engine for the load case of the internal combustion engine (e.g., transition from electrical motoring to hybrid motoring or hybrid motoring with recuperation requirement).

The objective is achieved according to the exemplary embodiments and/or exemplary methods of the present invention by evaluating parameters characterizing the combustion process, especially pressure changes and/or vibrations, to detect the independent running of the internal combustion engine. This has the advantage that a signal is utilized which is produced solely by the working mode of the internal combustion engine. In this context, influence by the electric motor is not possible, since a signal is considered which draws upon the combustion processes, that are caused in the internal combustion engine by its active running, for assessing an independently running internal combustion engine.

In one variant, the signal of a knock sensor, disposed on the internal combustion engine, is evaluated. The use of a knock sensor for recognizing the independent running of the internal combustion engine, which detects structure-borne-noise vibrations on the housing of the internal combustion engine caused by the combustion process, falls back upon sensors normally mounted on the internal combustion engine. Suitable evaluation electronics for the signal from the knock sensor are also already available in the motor vehicle, so that it is possible to dispense with additional components in terms of hardware in order to carry out the method. Merely one software change allows the signal of the knock sensor to be evaluated with respect to the independent running of the internal combustion engine.

Advantageously, the signal of the knock sensor is compared to a predefined reference range, and if the signal of the knock sensor falls within the predefined reference range, this is indicative of the independent running of the internal combustion engine. The selection of the reference range ensures that the signal is only able to assume values which are typical for a normal sequence of combustions within the internal combustion engine. In this context, overshoot signals of the knock sensor which take place, in particular, due to combustions that are not caused by the ignition spark of a spark plug, and which produce a very high pressure rise in the internal combustion engine, are reliably left out of consideration.

In one refinement, the signal of the knock sensor is evaluated in terms of its amplitude and/or in terms of its frequency. With amplitude or frequency, properties of vibrations which typically characterize the signal pattern are therefore considered. In so doing, an individual reference range is predefined for each amplitude and for each frequency for the comparison to the signal of the knock sensor, so that the amplitude is compared with an amplitude reference range and the frequency is compared with a frequency reference range.

In one variant, to start the internal combustion engine, an engine management outputs a signal to the start-assist apparatus and calculates at least one controlled variable for the internal combustion engine that is set at the internal combustion engine, the at least one controlled variable of the started internal combustion engine being measured, and the signal of the knock sensor being evaluated in the event the measured controlled variable has a value greater than zero. The functioning of the actuators mounted on the internal combustion engine is checked by the additional evaluation of the controlled variables, whereby it is determined whether the internal combustion engine can also really be in independent motion.

The controlled variables, which are set and measured by the engine management, relate in particular to the injection and/or the ignition of the internal combustion engine. Given adjusted charge, the combustion process within the internal combustion engine is controlled sufficiently with these controlled variables. Going into detail, such controlled variables may take the form of injection time, moment of ignition or crankshaft angle at which an ignition is to take place. Methods for determining such controlled variables are stored in the engine management, and therefore do not have to be additionally developed, thus saving on development time.

In a further refinement, the signal of the knock sensor is filtered prior to evaluation. In this manner, the signals are freed of noise, thereby permitting a precise evaluation of the knock-sensor signal.

Advantageously, in the event one value of the two measured controlled variables of the internal combustion engine is unequal to zero and when a value of at least one of the measured signals is outside of the corresponding reference range, a defect of one of the actuators adjusting the controlled variable in the internal combustion engine is inferred. In this case, a non-independent running of the internal combustion engine is recognized.

In one specific embodiment, predefined operating states of the internal combustion engine and/or of the overall system are restricted or forestalled upon recognition the internal combustion engine is not running independently. These operating states may include load-point shifts, as well as the deactivation of a start/stop functionality of the motor vehicle.

In one especially simple variant, a start or a stop of the internal combustion engine is recognized on the basis of the independent running of the internal combustion engine.

A further development of the exemplary embodiments and/or exemplary methods of the present invention relates to a device for detecting the independent running of an internal combustion engine, the device putting out a signal to a start-assist apparatus to tow-start the internal combustion engine from its position of rest. To reliably detect the independent running of the internal combustion engine after it has been started, an evaluating arrangement evaluates parameters characterizing the combustion process of the internal combustion engine, especially pressure changes or vibrations, in order to detect the independent running of the internal combustion engine. In this manner, only those signals are considered for detecting the start of the internal combustion engine which are generated solely by the internal combustion engine during the combustion process, and which are not influenced by the start-assist apparatus.

In particular, a signal is received from a knock sensor and evaluated when the internal combustion engine has been started. Costs are reduced by the use of sensors normally already present on the internal combustion engine.

The start-assist apparatus advantageously takes the form of a starter or an electric motor of a hybrid vehicle. Thus, the method of the present invention is usable both in conventional motor vehicles and in hybrid vehicles.

The exemplary embodiments and/or exemplary methods of the present invention permits numerous specific embodiments. One of these shall be described in detail with reference to the figures shown in the drawing.

DETAILED DESCRIPTION

Figure 1:
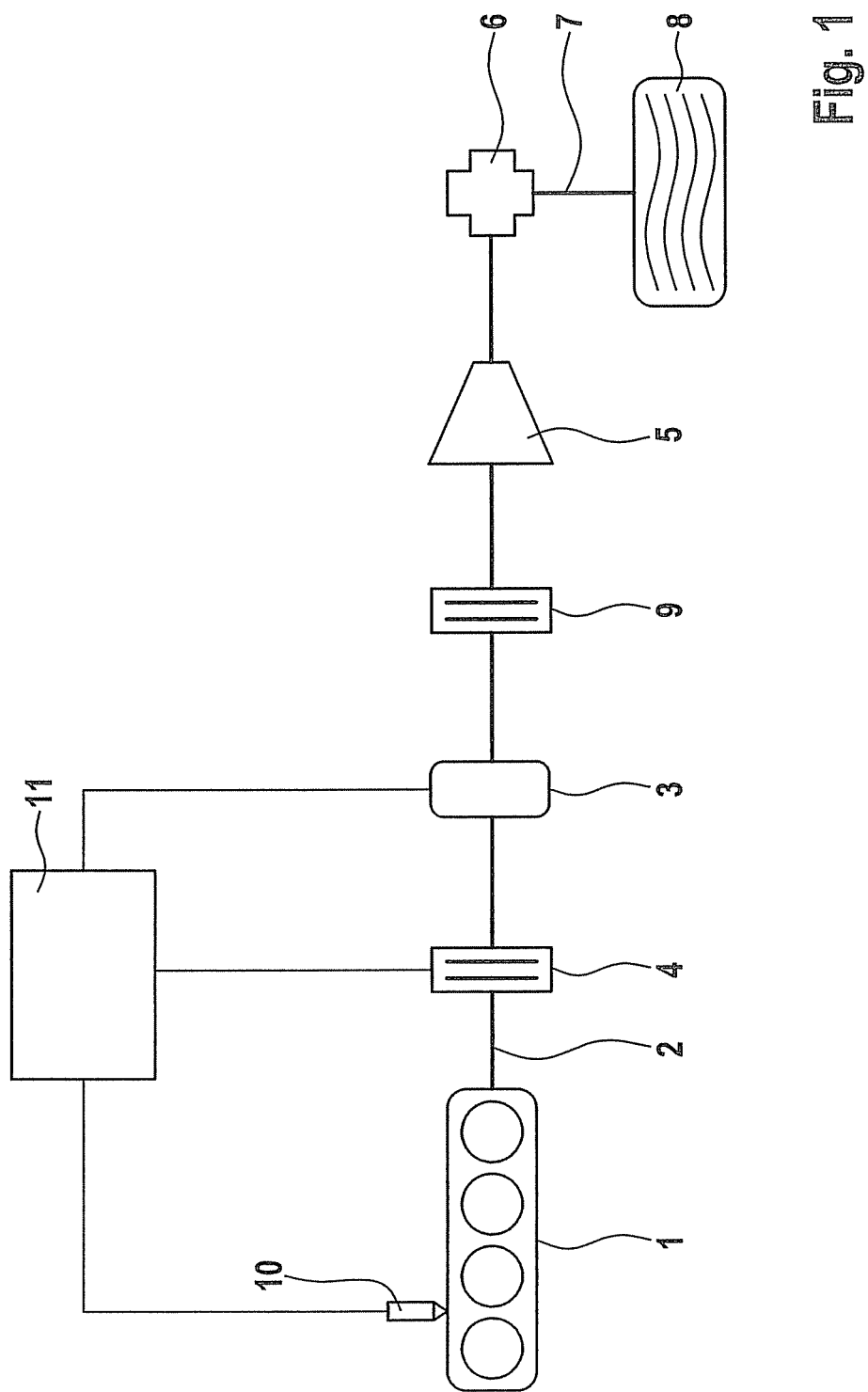
FIG. 1 shows a hybrid system.

FIG. 1 shows a schematic diagram for a hybrid drive in a motor vehicle. An internal combustion engine 1 is connected to an electric motor 3 via a drive shaft 2. Electric motor 3 is seated on drive shaft 2 of the drive train of the motor vehicle. Situated between internal combustion engine 1 and electric motor 3 is an interrupting clutch 4, which in the open state, allows the motor vehicle to operate solely on electrical power using only electric motor 3. Electric motor 3 is connected to a transmission 5 that is adjacent to a differential 6. This differential 6 is supported on a side shaft 7 that drives a vehicle wheel 8.

Located between electric motor 3 and transmission 5 is a further clutch 9 that is used for starting the motor vehicle from rest and is actuated by the driver of the motor vehicle when the motor vehicle goes from the standing to the driving state. Also situated on internal combustion engine 1 is a knock sensor 10 that is connected to a control unit 11 which, in addition, is connected to electric motor 3.

A hybrid vehicle is usually started up by electric motor 3 when the vehicle is at a standstill, so that initially, it is powered solely electrically. The power output to be set in respect to the hybrid vehicle is defined by the driver by actuation of an accelerator. If the power output by electric motor 3 is no longer sufficient to satisfy the driver command, control unit 11 decides that internal combustion engine 1, up to now in the rest state, should be started. At this point, interrupting clutch 4, which is situated between internal combustion engine 1 and electric motor 3 and is likewise connected to control unit 11, is closed. In so doing, a rotary motion is transmitted by electric motor 3 via closed interrupting clutch 4 to drive shaft 2, which up to now has been in a state of rest, and therefore to internal combustion engine 1. At the same time, by demand of control unit 11, the power output of electric motor 3 is increased, so that electric motor 3 is also able to tow-start the load of internal combustion engine 1 accordingly. In addition, at this point in time, control unit 11 calculates controlled variables for the injection such as the injection time of the injectors and the moment of ignition or the angle of the crankshaft at which the ignition should take place in the individual cylinders of internal combustion engine 1.

Figure 2:
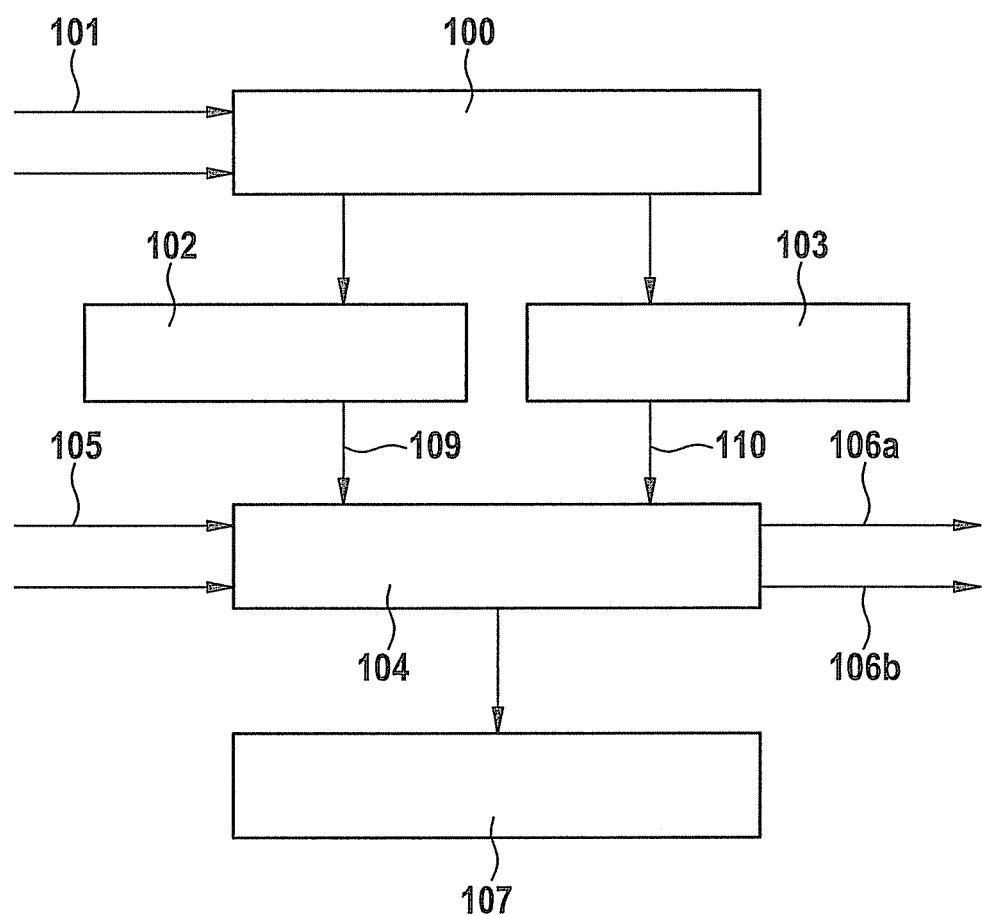
FIG. 2 shows a flowchart for detecting the independent running of an internal combustion engine.

In order to now determine whether internal combustion engine 1 is also running independently, a sequence control, shown in FIG. 2, starts in control unit 11. In a signal conditioning process in block 100, output signals 101 are received from knock sensor 10 and evaluated. These output signals 101 are conditioned in the signal-conditioning process (block 100) by suitable filters in such a way that output signals 101 are freed of noise and are able to be supplied in the form of evaluation signals 109 and 110 to an evaluation process. In this context, output signals 101 supplied by knock sensor 10 are differentiated into amplitude evaluation signals 109 (block 102) and frequency evaluation signals 110 (block 103). Depending upon the form of the evaluation, either amplitude evaluation signals 109 of block 102 or frequency evaluation signals 110 of block 103, or perhaps also both types of signals may be considered for assessing the independent running of internal combustion engine 1.

Amplitude evaluation signals 109 in block 102 or frequency evaluation signals 110 in block 103 made available are supplied to a signal evaluation process in block 104. The signal evaluation in block 104 receives information about the injection and the ignition, respectively, measured in independently moving internal combustion engine 1, as input signals 105. Such input signals 105 characterize the state of internal combustion engine 1, and are either the crankshaft angle, the moment of ignition or the injection time.

If these input signals 105 have a value greater than zero, the signal evaluation is carried out. During the signal evaluation, amplitude evaluation signals 109 are compared to an amplitude reference range and frequency evaluation signals 110 are compared to a frequency reference range. If amplitude values 106a and frequency values 106b, supplied by knock sensor 10, lie in the respective amplitude reference range or frequency reference range, it is assumed that internal combustion engine 1 has not only started to operate independently, but is also functioning in a correct operating state.

However, if it is determined in the signal evaluation in block 104 that at least one input signal 105, which is supplied as input variable of the injection or of the ignition, is equal to zero, then in block 107, a diagnosis is performed or there is a switchover to an error handling. If input signals 105 are unequal to zero, amplitude evaluation signals 109 and/or frequency evaluation signals 110 are taken into consideration for the diagnosis of an independently running internal combustion engine 1. If amplitude evaluation signals 109 and/or frequency evaluation signals 110 lie outside of the corresponding reference range, in block 107, a diagnosis is carried out or a switch is made to an error handling. As a result of the diagnosis, operating states such as the shift of the load point and/or the start/stop functionality of the motor vehicle are then no longer carried out.

Based on the method of the present invention, not only is it possible to reliably establish the start of the internal combustion engine, but the stop of internal combustion engine 1 may be determined, as well. In this context, the various modes with respect to the start of internal combustion engine 1 by electric motor 3 or the transition from operation solely on electrical power to hybrid operation no longer have to be taken into account explicitly. The result is that an evaluating logic may be kept simple. A precise assertion about the independent running and the stop of internal combustion engine 1 may be made on the basis of the signal from knock sensor 10.

What is claimed is:

1. A method for an internal combustion engine in a hybrid electrical vehicle, the method comprising:
   tow-starting the internal combustion engine in the hybrid electrical vehicle from its position of rest with a start-assist apparatus; and
   subsequent to the tow-starting:
      obtaining a knock signal component from output of a knock sensor disposed on the internal combustion engine in the hybrid electrical vehicle; and
      evaluating, based on the knock signal component, at least one of:
         a change in pressure that characterizes a combustion process in the hybrid electrical vehicle; and
         vibrations that characterize the combustion process in the hybrid electrical vehicle;
      wherein the evaluating includes comparing the knock signal component to a respective predefined reference range; and
      wherein the method further comprises determining that the internal combustion engine in the hybrid electrical vehicle is independently running responsive to a result of the comparing being that the knock signal component is within the respective predefined reference range.

2. The method of claim 1, wherein the signal of the knock sensor is evaluated in terms of at least one of an amplitude and a frequency of the signal.

3. The method of claim 1, wherein the signal of the knock sensor is filtered prior to the evaluation.

4. The method of claim 1, wherein one of a start and a stop of the internal combustion engine is detected based on the independent running of the internal combustion engine.

5. A method for detecting an independent running of an internal combustion engine, the method comprising:
   tow-starting the internal combustion engine from its position of rest with a start-assist apparatus; and
   subsequent to the tow-starting, evaluating parameters derived from a signal of a knock sensor, the parameters including at least one of pressure changes and vibrations, that characterize a combustion process;
   wherein:
      to start the internal combustion engine, an engine management outputs a signal to the start-assist apparatus and calculates at least one controlled variable for the internal combustion engine that is set at the internal combustion engine;
      the at least one controlled variable of the started internal combustion engine is measured; and
      the evaluation of the parameters is performed responsive to a determination that the measured controlled variable has a value greater than zero.

6. The method of claim 5, wherein the controlled variables relate to at least one of the injection and the ignition of the internal combustion engine.

7. The method of claim 5, wherein the knock sensor is disposed on the internal combustion engine in the hybrid electrical vehicle, and the evaluation of the signal of the knock sensor is performed to detect the independent running.

8. A method for detecting an independent running of an internal combustion engine, the method comprising:
   tow-starting the internal combustion engine from its position of rest with a start-assist apparatus; and
   subsequent to the tow-starting, evaluating parameters derived from a signal of a knock sensor, the parameters including at least one of pressure changes and vibrations, that characterize a combustion process;
   wherein, if a value of one of two measured controlled variables of the internal combustion engine is not zero and if a value of at least one of the evaluated parameters is outside a reference range, a defect of an actuator that adjusts the controlled variable is inferred.

9. The method of claim 8, wherein predefined operating states of at least one of the internal combustion engine and an overall system that includes the internal combustion engine are at least one of restricted and forestalled upon recognition that the internal combustion engine is not running independently.

10. The method of claim 8, wherein a non-independent running of the internal combustion engine is determined if a value of the one of the two controlled variables of the internal combustion engine is not zero and if the value of the at least one of the evaluated parameters is outside the reference range.

11. A device for an internal combustion engine in a hybrid electrical vehicle, the device comprising:
   a signal arrangement configured to output a signal to a start-assist apparatus to tow-start the internal combustion engine from its position of rest; and
   an evaluating arrangement configured to perform the following subsequent to the tow-starting:
      obtain a knock signal component from output of a knock sensor; and
      evaluate, based on the knock signal component, at least one of:
         a change in pressure that characterizes a combustion process in the hybrid electrical vehicle; and
         vibrations that characterize a combustion process in the hybrid electrical vehicle;
   wherein the evaluation includes comparing the knock signal component to a respective predefined reference range; and wherein the evaluating arrangement is further configured to determine that the internal combustion engine in the hybrid electrical vehicle is independently running responsive to a result of the comparison being that the knock signal component is within the respective predefined reference range.

12. The method of claim 11, wherein:
the knock signal component includes a frequency of a knock signal of the knock sensor and an amplitude of the knock signal of the knock sensor;
the comparing includes comparing each of the frequency and the amplitude to a respective predefined reference range; and
the independent running of the internal combustion engine is determined in response to a combination of results of the comparisons beings that both the frequency and the amplitude are within their respective predefined ranges.

13. The method of claim 11, wherein the knock signal component includes one of a frequency of a knock signal of the knock sensor and an amplitude of the knock signal of the knock sensor.

14. The device of claim 11, wherein the evaluating arrangement receives the knock signal from the knock sensor when the internal combustion engine has been started.

15. The device of claim 14, wherein the start-assist apparatus includes one of a starter and an electric motor of the hybrid electrical vehicle.

\* \* \* \* \*